Aug. 2, 1955

W. J. READING 2,714,257

EGG DRYING MACHINE

Filed Aug. 26, 1950

Inventor
Walter J. Reading
by Bair, Freeman
& Molinare
Attys.

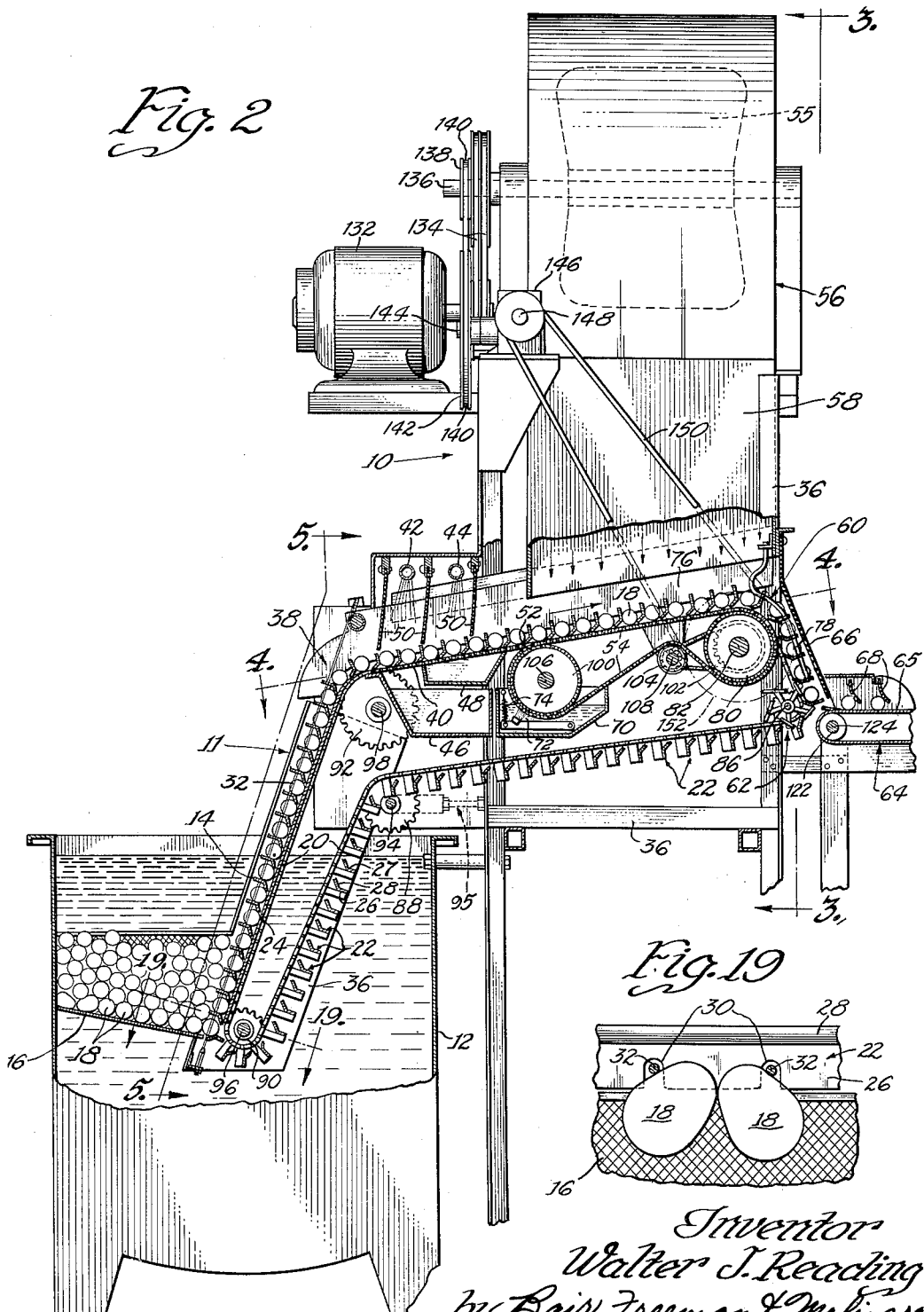

Aug. 2, 1955     W. J. READING     2,714,257
EGG DRYING MACHINE
Filed Aug. 26, 1950     5 Sheets-Sheet 3
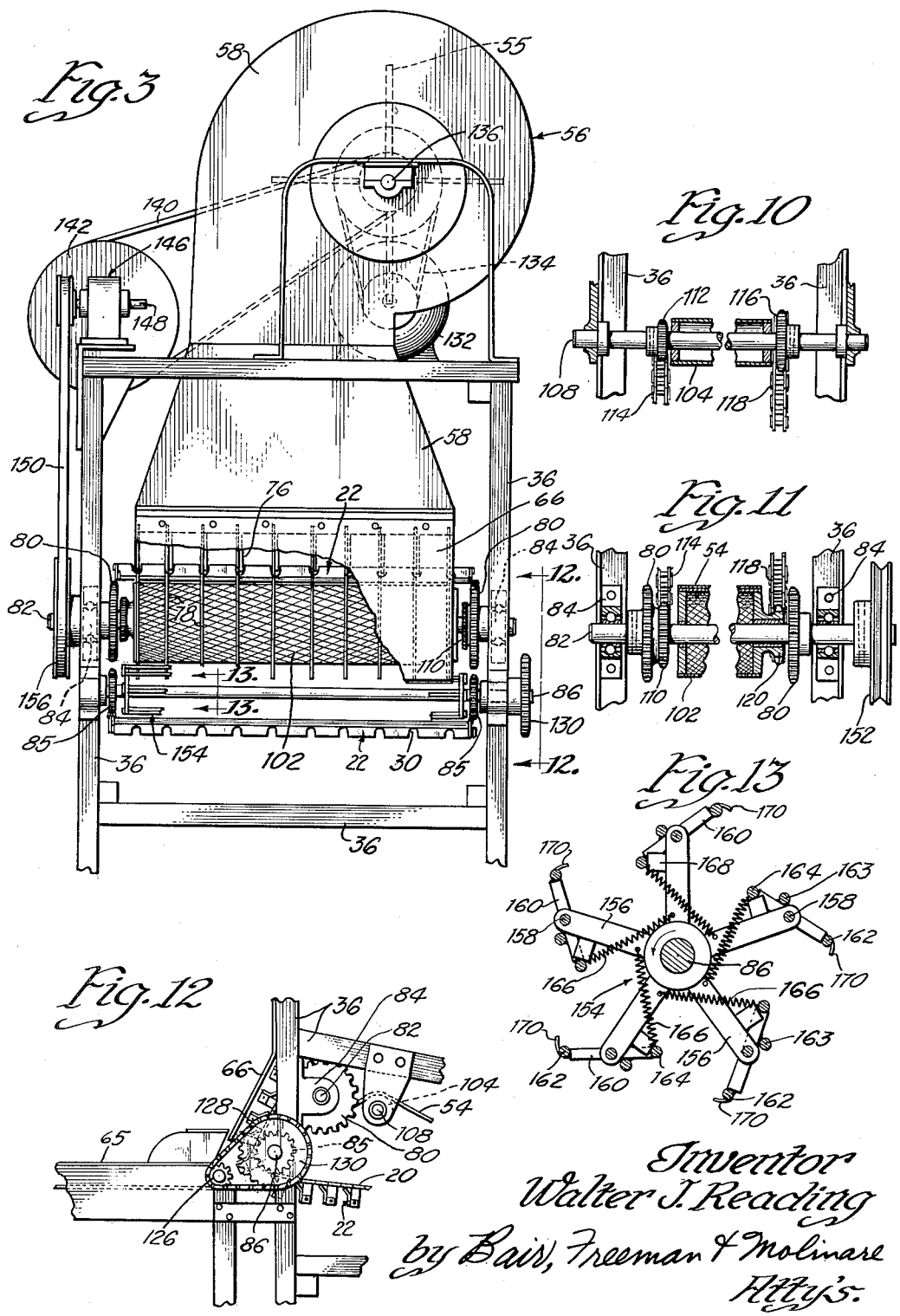

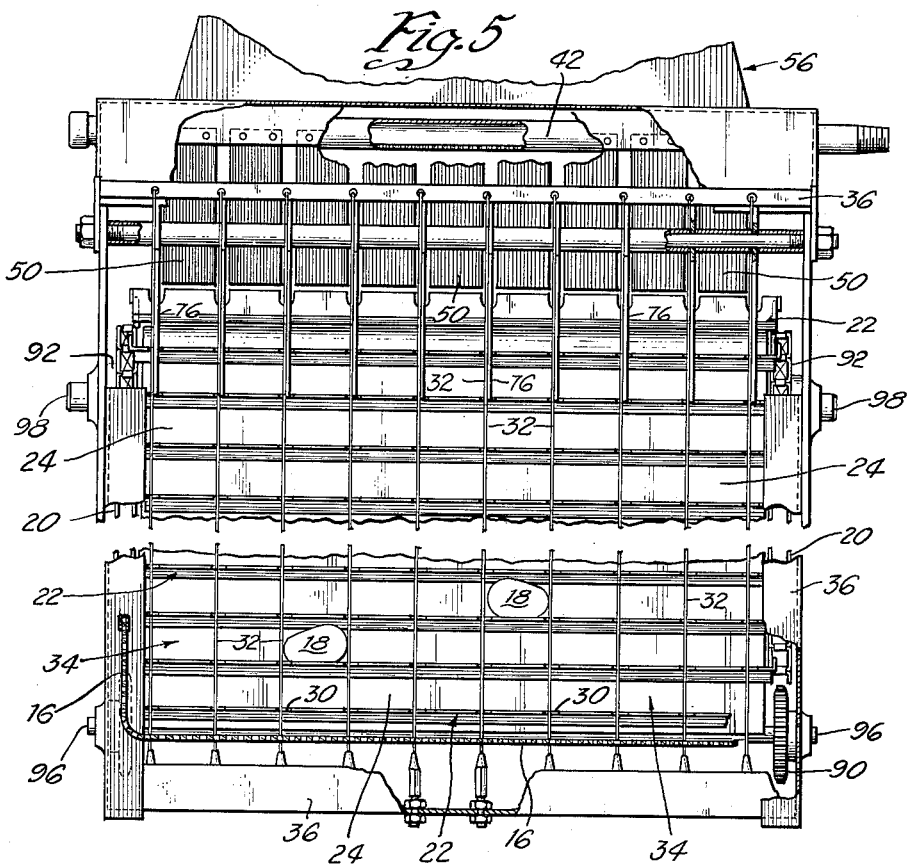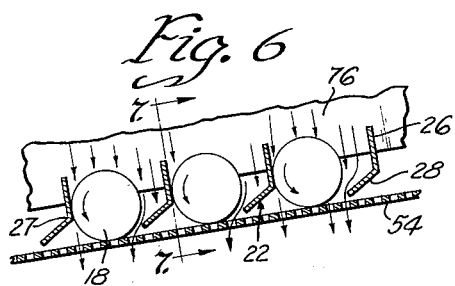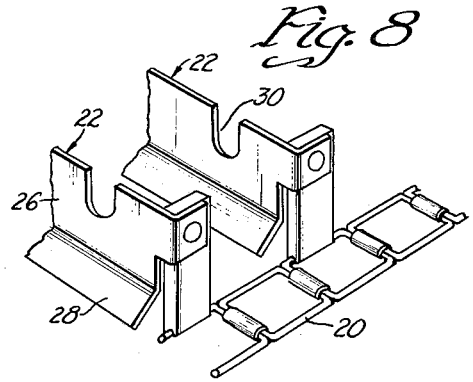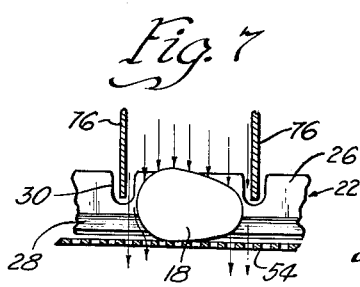

Aug. 2, 1955 W. J. READING 2,714,257
EGG DRYING MACHINE
Filed Aug. 26, 1950 5 Sheets-Sheet 5
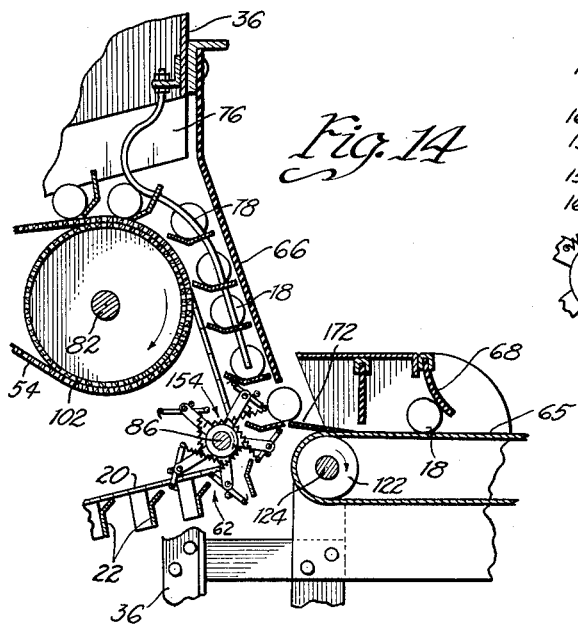
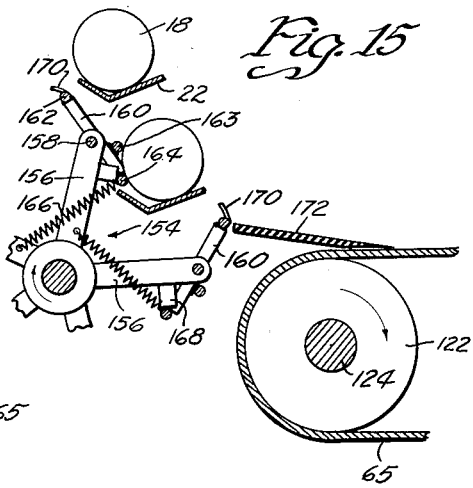
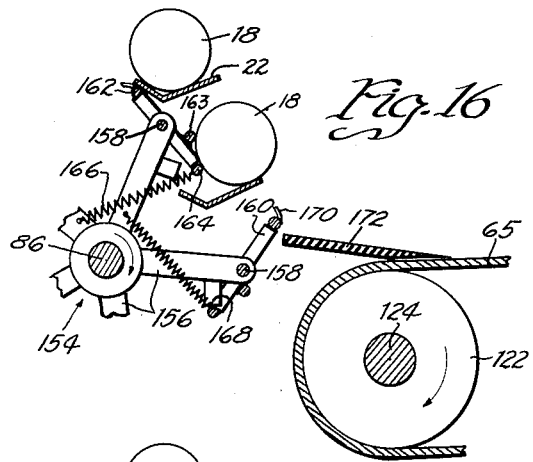
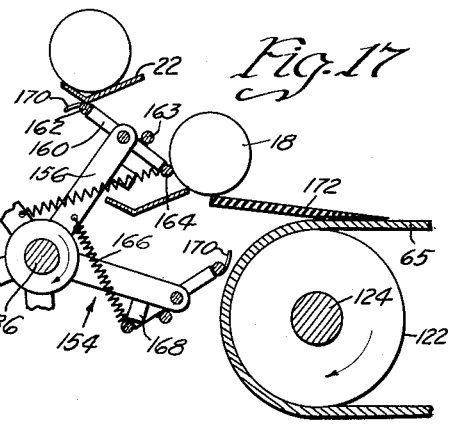
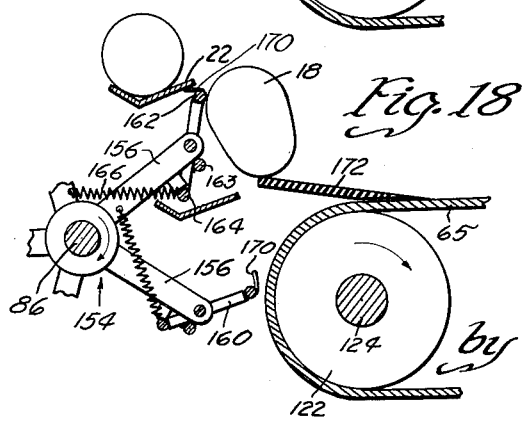
Inventor
Walter J. Reading
by Bair, Freeman & Molinare
Atty's.

United States Patent Office 2,714,257
Patented Aug. 2, 1955

2,714,257

EGG DRYING MACHINE

Walter Jesse Reading, Ottumwa, Iowa

Application August 26, 1950, Serial No. 181,667

25 Claims. (Cl. 34—85)

This invention relates to a machine for cleaning eggs, and more particularly to an automatic machine for drying eggs after they have been washed.

The recent tendency in the egg industry has been to automatically process eggs, because the operation of mass production machines reduces costs and speeds production. One of the major steps in processing eggs for delivery to the consumer is the drying of the eggs after they have been washed.

In the drying of eggs, it is very essential that no heat be used, as heat causes spoilage. Further, in drying an egg, if too much air is blown over the egg there will be shrinkage of the egg, which is undesirable.

There is often a tendency of an egg to have a wet spot where it rests upon the floor of a conveyor, even though the rest of the egg may be dry, and this too is undesirable.

There are quite a few other problems that are attendant with the construction of an automatic egg drying machine. One of these problems is the loading of eggs onto the conveyor and the avoidance of clogging or bridging over of the conveyor by the eggs. Another problem is that of reducing breakage of the eggs. A further problem is the cleaning of the conveyor in case there is some egg breakage. Still a further problem is the discharge of the dried eggs from the machine and the reducing of breakage at that point.

Thus, one of the objects of this invention is to produce a machine for drying eggs in which no heat is applied to the eggs during the drying process.

Another object of this invention is to provide an egg drying machine in which the eggs will be completely dried and will be ready for oiling.

A further object of this invention is to provide an egg drying machine which blows air over the eggs in the drying process, and wherein the period during which air is blown over the eggs is reduced to as small a time as possible, so as to reduce evaporation of the egg meat.

Still another object of this invention is to provide an automatic conveyor for an egg drying machine in which the tendency of clogging or bridging over of the conveyor by the eggs is substantially eliminated.

Still a further object of this invention is to provide an egg drying machine which is automatically loaded and unloaded, and in which the breakage of the eggs during the loading and unloading process is greatly reduced.

Another object of this invention is to provide an egg drying machine having a conveyor means for transporting the eggs therethrough, in which is provided means for cleaning the conveyor in case there is breakage of eggs.

And still another object of this invention is to provide an egg drying machine wherein air is blown over the eggs to effect drying, wherein the eggs are continually rotated during the period that the air is blown over them.

Still a further object of this invention is to provide a novel and effective discharge means for discharging eggs from a conveyor system.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 2 is a side elevational view, partly in cross section, of the egg drying machine and tank shown in Figure 1;

Figure 3 is an end elevational view of the egg drying machine with parts broken away, and is taken on the line 3—3 of Figure 2;

Figure 5 is an enlarged view of the steeply ascending portion of the conveyor of the egg drying machine, and is taken on line 5—5 of Figure 2;

Figure 6 is an enlarged side view of a portion of the conveyor located below the blower and showing by arrows the air flow over the eggs;

Figure 7 is a sectional view taken on the line 7—7 of Figure 6;

Figure 8 is an isometric view of the conveyor chain and conveyor flights, showing details of construction;

Figure 10 is a cross sectional view of the counter drum and associate elements for the movable screen drive, and is taken on line 10—10 of Figure 4;

Figure 11 is a cross sectional view of the drive drum for the movable screen and associate elements and is taken on line 11—11 of Figure 4;

Figure 12 is an elevational view of details of the drive connection between the first conveyor and the second conveyor and is taken on line 12—12 of Figure 3;

Figure 13 is a side view of an ejection spider, the pivotal arms and the transverse bars connected to said pivotal arms, and is taken on the line 13—13 of Figure 3;

Figure 14 is a side view of the ejection spiders, transverse bars and conveyor, showing a transverse bar forcing an egg from the first conveyor to a second conveyor for receiving the ejected eggs;

Figure 15 is an enlarged view of parts of the ejection spiders and transverse bars showing in detail the way a transverse bar first engages an egg to be ejected from the conveyor;

Figure 16 is similar to Figure 15 and is taken a short time after Figure 15 and shows the upper transverse bar in engagement with the upper flight and with the egg further ejected from the lower flight;

Figure 17 is similar to Figures 15 and 16 and is taken a short time after Figure 16, showing an egg completely ejected from the lower flight with the upper transverse bar just about to leave contact with the upper flight;

Figure 18 shows the action of the upper transverse bar upon an egg that attempts to roll back into the conveyor flight, and is taken at a time shortly after that shown in Figure 17.

Figure 19 shows what happens when two eggs try to enter the same compartment simultaneously, and is taken on line 19—19 of Figure 2.

Figure 1:
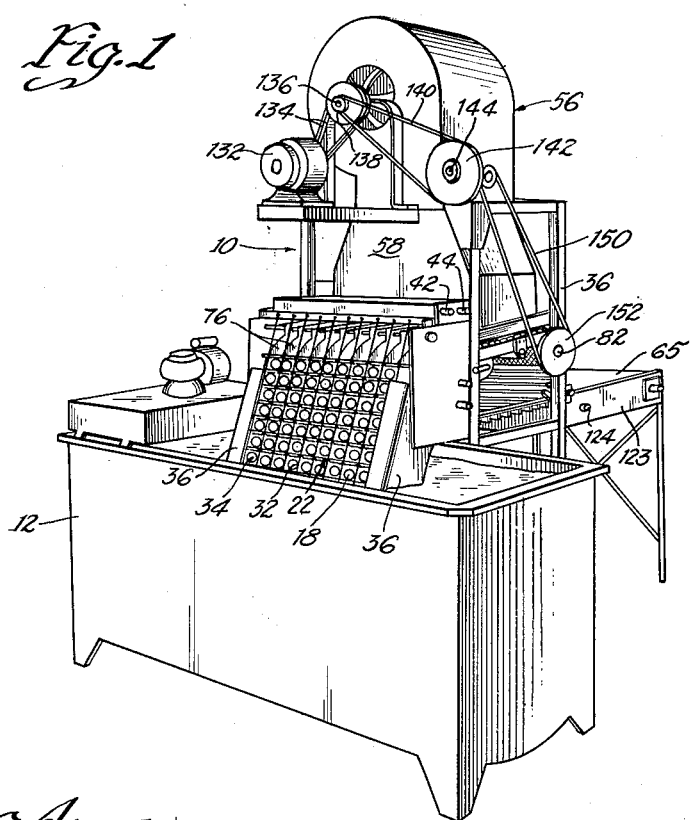
Figure 1 is an isometric view of the egg drying machine shown adjacent a tank of fluid having the washed eggs therein, and showing a portion of the conveyor means of the egg drying machine immersed in said tank.
Figure 4:
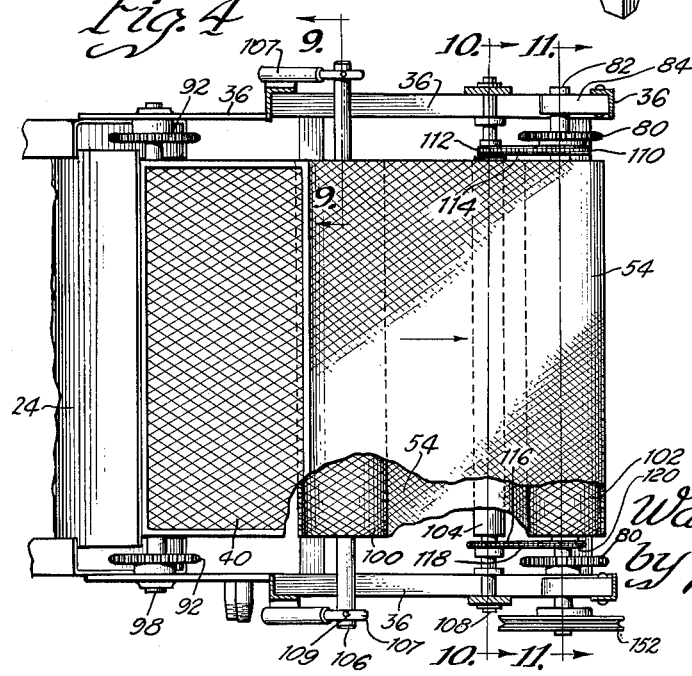
Figure 4 is a plan view of a surface over which the conveyor and eggs pass, with parts broken away, and is taken on the line 4—4 of Figure 2.

Referring now to the drawings, an egg drying machine generally indicated at 10 is shown mounted adjacent a tank of fluid 12 wherein the washed eggs are located. The egg washing machine 10 is provided with a conveyor generally indicated at 11, which conveys the washed eggs through the drying machine. A portion 14 of the conveyor 11 is immersed in the tank of fluid and is adapted to pick up and convey the washed eggs through the egg drying machine.

Referring more particularly to Figure 2, there is shown a wire basket 16 which is secured to the lower end of the immersed portion 14 of conveyor 11. The basket 16 is adapted to receive the washed eggs 18. The bottom of wire basket 16 is inclined with respect to the horizontal so that the eggs tend to roll under the force of gravity to the lowest point of said basket 16. The lowest point of basket 16 is immediately adjacent the lower portion 14 of conveyor 11 so that the eggs 18 are fed by gravity to the conveyor 11.

Referring more particularly to Figures 2, 5 and 8, the conveyor 11 includes a pair of continuous chains 20 which are located at the side edges of the conveyor 11. Fixed to alternate lengths of the chains 20 are conveyor flights 22. These conveyor flights extend transversely to the direction of motion of the conveyor 11. The conveyor flights 22 are spaced apart a sufficient distance to accommodate the maximum size of egg that would be passed through the dryer.

As can be seen in Figure 2, the outer edge of the flights 22 just miss the lower edge of the wire basket 16 as they pass adjacent the basket 16, so that the eggs will roll from the basket 16 into the space between successive pair of flights. The dimension of the depth of the space between successive pair of flights is such that only a single layer of eggs may be accommodated between successive flights 22. The length of flights 22 is designed to accommodate a plurality of eggs and in the form shown in this specific embodiment of my invention a total of nine eggs may be accommodated by each flight.

A sheet metal base member 24 is provided adjacent the under side of the portion of the conveyor 14 which is immersed in tank 12. Thus, as the eggs 18 enter between a pair of flights 22, they come to rest against the base member 24, and as the flights move upward the eggs 18 are rolled over the surface of base 24.

The flights 22 themselves generally include two portions. The outer or upper portions 26 of flights 22 are perpendicular to the direction of motion of the conveyor 11. The inner or lower portion 28 of flights 22 extend at an obtuse angle from the bottom edge of said outer portion 26 in a direction opposite to the direction of travel of the conveyor 11. The upper portion 26 and the lower portion 28 form a crotch 27 therebetween. The purpose of this obliquely extending lower portion 28 and of the crotch 27 will be pointed out in detail hereinafter.

The upper portions 26 of flights 22 are provided with a plurality of recesses 30. A plurality of aligning wires 32 are positioned so that they register with the recesses 30 of the flights 22. These wires 32 are fixed in position and cooperate with the movable flights 22 to form a plurality of compartments generally designated at 34, which are of a size sufficient to receive an egg.

The entire conveyor 11 is enclosed along the sides thereof by structural portions which shall be generally designated by numeral 36. The wire basket 16 is supported from these structural portions 36 and the wire aligning members 32 are secured at their extremities to parts of the structure 36.

After the eggs 18 are picked up by the flights 22 from the basket 16, they are carried upwardly at a rather steep angle until they are clear of the tank 12. The conveyor then turns rather sharply towards a horizontal position at a point generally indicated at 38 but is still maintained in an ascending attitude for reasons that will be set forth ehreinafter. A portion of the run of the conveyor 11, after the rather sharp turn 38, then passes over a screen base 40.

Above this screen base 40 are mounted a pair of spray devices 42 and 44. The fluid issuing from spray 42 may be water and the fluid issuing from spray 44 may be chlorine or some other disinfecting fluid. A tray or pan for catching and draining the fluid sprayed from spray 42 is provided at 46 and a tray or pan for catching the fluid sprayed from spray 44 is provided at 48. The purpose of the sprays 42 and 44 is to clean the conveyor and the eggs, if by any chance some of the eggs have broken and their contents have been spilled onto the conveyor, or if some of the eggs are leaking due to previous injury.

From the standpoint of cleanliness and sterilization, it is desirable that the conveyor be sprayed at a point between where the eggs are taken on and where the eggs are dried. The screen 40 permits the removal of the fluid sprayed from sprays 42 and 44. The trays or pans 46 and 48 are secured to the structure 36 by any appropriate means, but are removable for cleaning. A plurality of curtains 50 are provided for defining the areas in which the sprays are located and for preventing the splashing of fluid.

The screen 40 extends to the point 52 where a movable screen 54 is positioned in line with and as an extension of screen 40. This movable screen 54 provides a support for the eggs being rolled by the conveyor 11. The movable screen 54 is moving in the same direction as the direction of motion of the conveyor 11, but at a greater speed. In the present embodiment of my invention, the preferable speed of the movable screen 54 is three times as great as the speed of the conveyor 11. Because the screen 54 is going faster than the conveyor 11, it causes the eggs 18 to be rotated in a direction opposite to the direction that they normally would rotate in, if they were pushed by the conveyor 11. Thus, as seen in Figures 2 and 6, the eggs passing over the movable screen 54 will be rotating in a counterclockwise direction.

Mounted directly over the movable screen 54 are the blower means generally indicated at 56 including a fan 55. A hood or housing 58 encloses the blower and directs the air downwardly over the conveyor 11 and the movable screen 54, so that the air passes over the rotating eggs 18 and dries the eggs.

After the eggs have passed through the area where air is passed over them, the conveyor 11 makes a rather sharp turn at a point generally indicated at 60, and the conveyor descends at a rather steep angle. An ejector generally indicated at 62 is positioned adjacent the conveyor 11 at the lower end of the region of steep descent. This ejector 62 acts to force the eggs horizontally from the conveyor 11 to a receiving means, generally indicated at 64. This receiving means includes a second conveyor 65 which transports the dried eggs to another station for further handling.

The conveyor 11 then makes a rather sharp turn around the ejector 62 and travels to the tank 12 so that the process of conveying, drying and ejecting the eggs is a continuous one.

A rubber curtain or apron 66 is secured to the blower housing 58 and hangs down over the open top of the conveyor 11 in the region of steep descent so as to keep the eggs in the conveyor 11 from rolling or being blown out of the conveyor. The lower end of the curtain or apron 66 is spaced from the top of the receiving means 64 a distance sufficient to permit discharge of the eggs from the conveyor 11 to the receiving means 64.

A plurality of rubber curtains 68 are disposed above the second conveyor 65 and are adapted to control the rolling of the eggs 18 upon said second conveyor 65. This prevents the eggs 18 from rolling against each other and reduces the possibility of some of the eggs being cracked.

Means for cleaning and sterilizing the moving screen 54 is also provided. For this purpose, a tank 70 containing cleaning and sterilizing fluid is mounted so that the movable screen 54 passes therethrough. A brush 72 is also mounted in tank 70 and is biased by means of spring 74 against the surface of the movable screen 54 and assists in cleaning any dirt and debris from movable screen 54. The tank 70 is removably secured to structure 36 so that it may be removed from the machine when it is to be cleaned.

Referring now to the aligning means, a portion of which was described previously, the wires 32 cooperate with the movable flights 22 in the sharply ascending region of the conveyor 11 to maintain the eggs in rows. Adjacent the top of the ascending portion of the conveyor 11, the wires 32 terminate. A plurality of fixed sheet members 76 then extend from the upper ends of wires 32 and are positioned to register with the recesses 30 in flights 22 of the conveyor 11. These sheet members 76 extend around the sharply curved portions 38 of the conveyor run and continue up to and including the portion of the run of the conveyor 11 over which the drying air is blown.

These sheet members further cooperate with the flights 22 in the drying region in the following manner. If only wires were used to define the rows in which the eggs 18 are located, then when the eggs 18 pass under the blower 56, the air passing over the eggs would be deflected by the upper rounded portion of the egg and there would be little, if any, tendency of the air to recirculate back about the under rounded portion of the egg 18. Since there would be less circulation adjacent the lower portion of the eggs, there would be a tendency for drops of water to remain along the under side of egg 18 and not evaporate or be blown off.

On the other hand, by using sheet members 76, the air is guided to a greater extent than it would be by the use of wires. The air is partially stopped from being directed outwardly by the shape of the egg, since the air which would tend to move outwardly would strike the sheet members 76. This would force a greater amount of air to be recirculated around the under side of the egg as shown in Figure 7 and would increase the efficiency in blowing off and evaporating the water located thereon.

Further with respect to the means for aligning the eggs in rows as they are carried by the conveyor 11, a set of wires 78 is used in register with the recesses 30 in the flights 22 in the sharply descending region of the conveyor 11. These wires 78 are mounted on the blower housing 58 and extend substantially from the ends of sheet members 76 downwardly along the length of the sharply descending section of the path of the conveyor 11. This set of aligning wires 78 terminates above the level of discharge of the eggs from the conveyor 11 a distance sufficient to permit the ejector 62 to operate upon the eggs 18 without interference.

The feature of making the conveyor means ascend prior to and during the drying process is of importance, in that the natural drainage of fluid is in a direction opposite to the direction of the advance of the eggs 18. This is desirable, since the uppermost point of the ascent is where the eggs are to be most dry, and that is the region where there should be no fluid by reason of the downward drainage. Furthermore, the use of a screen base beneath the floor is particularly useful, in that it provides passage therethrough for the drying air. The use of a wire base over which to roll the eggs also provides for greater and faster drainage than the use of a flat base.

Once again referring back to the conveyor 11, the path of the conveyor 11 is determined by the position of sprockets over which the conveyor chain 20 passes. A pair of drive sprockets 80 are provided at the rather sharp bend 60 in the conveyor 11, where the conveyor changes its path from ascending to sharply descending. These sprockets 80 are fixed upon a shaft 82 which is journaled by bearings 84 in supporting structure 36. The conveyor chains 20 then pass over sprockets 85 which are fixed upon shaft 86. Shaft 86, too, is journaled in structure 36.

The conveyor chains 20 then pass over idling sprockets 88, 90 and 92, which are respectively fixed upon shafts 94, 96 and 98. The shafts 94, 96 and 98 are also journaled in structure 36. The position of shaft 94 and sprockets 88 mounted thereon is adjustable by means of a mechanism generally indicated at 95. This adjustment provides means for tensioning and taking up slack in the conveyor 11. Also mounted on shaft 86 are the ejection means 62, which will be described in detail hereinafter.

The movable screen 54 passes over drive drum 102, counter drum 104 and also over drum 100. Drum 102 is mounted upon shaft 82, while drums 100 and 104 are rotatably mounted respectively on shafts 106 and 108. Shaft 108 is journaled in structure 36 as shown in Figure 10.

Figure 9:
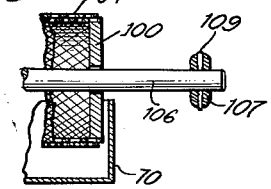
Figure 9 is a detail cross sectional view of a portion of the idling drum for the movable screen and support therefor, and is taken on line 9—9 of Figure 4.

The idling drum 100 is rotatably journaled on shaft 106. Drum 100 is positioned so that the lower portion thereof extends within tank 70. This provides that the movable screen 54 passing over drum 100 will be caused to pass through the cleaning and sterilizing fluid within tank 70. The shaft 106 is supported by arms 107 secured to structure 36. Shaft 106 is retained in position on arms 107 by means of pin 109, as best shown in Figure 9.

Referring now in particular to Figures 10 and 11, there is mounted on shaft 82 a sprocket 110 which drives a sprocket 112 on shaft 108 by means of a chain 114. The driven sprocket 112 causes the shaft 108 to rotate. A second sprocket 116, of larger diameter, is fixed on shaft 108 and rotates therewith. A chain 118 connects sprocket 116 to sprocket 120, which latter sprocket is rotatably journaled on shaft 82. Drum 102 is secured to sprocket 120 and also is rotatably journaled on shaft 82. By means of this arrangement, the drum 102 is caused to rotate at a faster rate than shaft 82 is rotating. For the particular embodiment of my invention, drum 102 rotates at a speed such that the speed of movable screen 54 is three times as fast as the speed of the conveyor 11. The surface of drum 102 is provided with means for gripping and causing the movable screen 54 to rotate. Both drums 100 and 102 are perforated (screen type) metal rollers to permit the blown air to pass therethrough.

Referring next to the receiving means 64, the second conveyor 65 passes over a drive drum 122 which is welded to drive shaft 124. Shaft 124 is journaled upon structure 123 (shown in Figure 1) and has a sprocket 126 mounted thereon, as seen in Figure 12. This sprocket 126 is driven through chain 128 which passes over a drive sprocket 130. Drive sprocket 130 is mounted on shaft 86 and rotates therewith. The ratio of the gearing between sprocket 130 and sprocket 126 is such that the speed of conveyor 65 is three times as fast as the speed of conveyor 11.

A single drive means is utilized to operate the fan 55 of blower 56, the conveyor 11, the second conveyor 65, and the movable screen 54. The driving means include a motor 132 which has a driving connection by means of belt 134 with blower shaft 136. A pulley 138 mounted on shaft 136 drives belt 140, which in turn rotates pulley 142 fixed to shaft 144. A gear reducer generally indicated at 146 provides an outlet shaft 148 which drives the shaft 82 by means of chain 150 and sprocket 152. The drive sprockets 80 are fixed to the shaft 82 and drive the conveyor 11. The sprocket 110 secured to shaft 82 drives drum 102 by means of sprockets 112, 116 and 120, in the manner as previously described. The conveyor chains 20 passing over sprockets 85 rotate shaft 86, which in turn drives second conveyor shaft 124 through sprocket 126 in the manner as previously described.

The means 62 for ejecting the eggs from the conveyor 11 includes a pair of spiders generally indicated at 154, which have a plurality of arms 156 radially extending therefrom. The spiders 154 are fixed to shaft 86 which is rotated by means of sprockets 85 over which the conveyor chains 20 pass. Each arm 156 has pivoted thereto by means of pin or pivot 158, a pivotable arm 160. A plurality of transverse bars 162, 163 and 164 are mounted on said pivotable arms 160. The transverse bars 162, 163 and 164 extend parallel to the flights 22.

The transverse bar 162 is mounted on one end of pivotable arm 160 and the transverse bar 164 is mounted at the other end of pivotable arm 160. This locates the two transverse bars 162 and 164 on opposite sides of the pin connection 158 between the pivotable arms 160 and the spider arms 156. The third transverse bar 163 is secured to the pivotable arms 160 at a point intermediate transverse bar 164 and the pin connection 158. The transverse bars 163 and 164 cooperate to engage the egg 18 to be ejected as shown in Figures 15 and 16, but as the ejection process continues, as shown in Figure 17, only transverse bar 164 remains in contact with the egg 18. In actual use, most eggs come out at somewhat of an angle and so bars 163 and 164 are both in contact with the egg for a longer period of time than shown in the figures.

Tension springs 166 connect the transverse bar 164 to one of the spider arms 156, thus biasing the pivotable arms in a predetermined position. Stops 168 are mounted on spider arms 156 and cooperate with transverse bars 164 to limit the movement of pivotable arms 160 under the bias of springs 166.

To understand the action of the ejector means 62, reference is had to Figures 14 to 18. As shown in Figure 14, the ejector means 62 rotates synchronously with the conveyor 11 so that one spider arm 156, with the ejecting transverse bars 162, 163 and 164, meshes with the space between each successive pair of flights. As can be seen in Figure 15, the transverse bars 163 and 164 engage the egg 18 as it is supported in the crotch 27 of flight 22. The preliminary action betwen transverse bars 163 and 164 and egg 18 is such as to begin to force egg 18 out from between successive flights 22. As further rotation takes place, the transverse bar 162 engages the flight 22 above the egg to be ejected. As the spider 154 tends to rotate, the pivotable arm 160 pivots about the pin 158, forcing the transverse bars 163 and 164 outwardly between the pair of successive flights 22. This occurs despite the restoring bias of spring 66.

As the spider 154 continues to rotate, the pivotable bar 160 pivots more and more about pin 158 and the transverse bars 163 and 164 are thrust further between the two successive flights 22, until the extreme position shown in Figure 17 is obtained. In that figure, the egg is just leaving the flight, to be reecived by the receiving means 64. At the extreme point shown in Figure 17, the transverse bar 162 is at the junction between portions 28 and 26 of the flight 22.

As further rotation takes place, the transverse bar 162 does not interfere any more with the upper flight 22 and the spring 166 pulls back the transverse bar 164 and the pivotable arm 160 pivots upon pin 158 back towards its original position. This brings the transverse bar 162 forward to the position shown in Figure 18, where it engages any egg 18 that attempts to roll backward into the space between the pair of successive flights 22. The bringing forward of the transverse bar 162 thus acts to further thrust forward the egg being ejected and to insure that it is forced out from between the flights. A wing 170 is secured to the transverse bar 162 and cooperates with the upper flight 22 to provide for a slower return of the pivotable arm 160 to its original position, whereby the transverse bar 162 will not snap forward sharply so as to crack the egg 18 which may be attempting to roll backward into the space between the flight 22.

To further provide for a smooth transfer of the eggs 18 from the conveyor 11 to the receiving means 64, a resilient shelf 172 is provided which is positioned where it receives the eggs upon discharge from the conveyor 11. This shelf 172 is spaced as close as possible to the conveyor whereby all the eggs that are discharged from the conveyor 11 are received by the shelf 172. This shelf slopes downward to the second conveyor 65 so that the eggs 18 which are received by the shelf 172 tend to roll off the shelf to the conveyor 65. To check any vigorous rolling of the eggs, a plurality of rubber curtains 68 are disposed above the second conveyor 65 and adapted to control the rolling of the eggs upon conveyor 65. The shelf 172 is adjustable in position (by means not shown), so as to provide the smoothest transfer of the eggs 18 from the first conveyor 11 to the second conveyor 65.

As has been previously described, the flight 22 has an outer or upper portion 26 which is positioned perpendicular to the direction of movement of the conveyor 11. The inner or lower portion 28 of flight 22 extends at an obtuse angle from said outer portion 26 in a direction opposite to the direction of travel of the conveyor 11, thereby forming a crotch 27 between portions 26 and 28. This shape of the flight is of great importance, for when the flights pass through the steeply descending run of the conveyor located between the sharp turn 60 and the ejector 62, the flight 22 acts as a cradle for supporting the eggs 18 in the crotch 27 thereof.

As will be noted, in Figure 14, the eggs are then spaced from any base support. This serves to position the egg solely on the flight 22, and ejecting the eggs 18 from the conveyor 11 is more easily accomplished. The shape of the flight also provides a surface for engaging the transverse bar 162 so as to pivot pivotable arm 160 forward to eject the eggs 18 from the conveyor 11. When the transverse bar 162 passes the crotch 27 of the flight 22, then the shape of the flight permits the spring 166 to return the pivotable arm 160 to its original position, as described hereinabove.

By providing that the inner portion 28 of the flight extends at an obtuse angle, from the bottom edge of the outer portion 26, in a direction opposite to the direction of travel of the conveyor 11, means are provided for directing the air being blown over the eggs toward the under surface of the egg in a direction opposite to the direction of rotation of the eggs as they pass over movable screen 54, as shown in Figure 6. This is very desirable, in that great efficiency in drying is thus obtained.

An important feature of the aligning means is the use of wires 32, with the cutouts 30 in the flights 22, to define the compartments 34 in the region where the eggs are fed into the conveyor. The use of wires 32 in the region where the eggs are picked up by the conveyor is superior to the use of sheet metal members such as shown at 76, in that bridging over or clogging of the conveyor is avoided by the use of wires 32. If sheet metal members were used, they would extend above the upper edge of flights 22. Then if two eggs attempted to enter the conveyor simultaneously between an adjacent pair of sheet metal members, they might jam against each other and clog.

This bridging over or clogging of the conveyor is impossible with the use of wires because the wires 32 lie in recesses 30 inwardly from the outer edge of the flight 22, as shown in Figure 19. Then when two eggs attempt to enter the conveyor simultaneously between an adjacent pair of wires 32, although they attempt to jam up, the moving flights 22 engage the eggs, as shown in Figure 19, and push the jammed up eggs out of position and break up the jam, so that the eggs may later be picked up properly by the conveyor.

With respect to the drying of the eggs, reference is had to Figure 6. As the eggs 18 are being rotated counterclockwise on the moving screen 54, the air being deflected by lower portion 28, of conveyor flight 22 forces the water on the eggs back under the eggs so that the water contacts the screen 54. The screen 54 is made of fine wire and of about ¼" mesh. When the drops of water on the egg contact the screen, the surface tension of the drop is destroyed by the screen and the water in the drop quickly flows off the egg and onto the screen. This method of drying is so successful that the greatest portion of the water on the egg is drained off in the first two or three inches of travel of the egg through the region where air is blown over the eggs.

After the greater portion of the water is drained off, all that remains on the egg is a very thin film of liquid which is easily evaporated by unheated air during the remainder of the run of the egg through the region where air is blown over the egg. The egg that is dried by this method is dry enough to oil immediately after discharge from the dryer.

With respect to the water that is on the screen 54 after it drains off the eggs, since the screen 54 is moving faster than the conveyor flights 22 and the eggs 18, the portion of the screen which drains the water from the egg moves ahead of the egg directly into the path of the blown air. In the direct path of the blown air, the water is easily blown from the screen 54, so that, except when receiving water directly from an egg 18, the screen 54 is kept relatively dry.

It will be appreciated that if the lower portion 28 of conveyor flight 22 were at right angles to the upper portion 26 of flight 22, then a surface at right angles to the direction of the path of the blown air would be presented. This would allow drops of water to cling to lower portion 28 particularly in the crotch 27. This would be undesirable as after passing the blower these drops may once again be deposited on the eggs, too late to be evaporated. However, by providing an obtuse angle at the crotch 27, as shown in Figure 6, this difficulty is obviated.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. Means for discharging eggs from a multi-flight moving conveyor wherein the flights are substantially parallel and extend transverse to the direction of motion of the conveyor, and the adjacent flights are spaced apart a distance large enough to accommodate only one egg therebetween; said means for discharging the eggs from the flights comprising a multi-armed spider adapted to be synchronously moved with the flights, pivotable arms mounted on the arms of the spider, a plurality of transverse bars secured to said pivotable arms, said bars extending in the same direction as the flights, said bars being disposed along the length of said pivotable arms so that at least one bar is located on each side of said pivotal connection between the pivotable arm and the spider arm, one of the plurality of transverse bars being adapted to engage the flight behind the egg to be ejected when the spider is rotated, whereby the pivotable arm is pivoted and a second transverse bar is extended between a pair of adjacent flights to eject the eggs located therebetween.

2. Means for discharging eggs from a multi-flight moving conveyor wherein the flights are substantially parallel and extend transverse to the direction of motion of the conveyor, and the adjacent flights are spaced apart a distance large enough to accommodate only one egg therebetween; said means for discharging the eggs from the flights comprising a multi-armed spider adapted to be synchronously moved with the flights, pivotable arms mounted on the arms of the spider, a plurality of transverse bars secured to said pivotable arms, said bars extending in the same direction as the flights, said bars being disposed along the length of said pivotable arms so that at least one bar is located on each side of said pivotal connection between the pivotable arm and the spider arm, one of the plurality of transverse bars being adapted to engage the flight behind the egg to be ejected when the spider is rotated, whereby the pivotable arm is pivoted and a second transverse bar is extended between a pair of adjacent flights to eject the eggs located therebetween, and spring means for restoring the pivotable arms to their original position after the first transverse bar is moved out of engagement with the flight as the spider rotates.

3. Means for discharging eggs from a multi-flight moving conveyor wherein the flights are substantially parallel and extend transverse to the direction of motion of the conveyor, and the adjacent flights are spaced apart a distance large enough to accommodate only one egg therebetween; said means for discharging the eggs from the flights comprising a multi-armed spider adapted to be synchronously moved with the flights, pivotable arms mounted on the arms of the spider, a plurality of transverse bars secured to said pivotable arms, said bars extending in the same direction as the flights, said bars being disposed along the length of said pivotable arms so that at least one bar is located on each side of said pivotal connection between the pivotable arm and the spider arm, a first bar of the plurality of transverse bars being adapted to engage the flight behind the egg to be ejected when the spider is rotated, whereby the pivotable arm is pivoted and a second transverse bar is extended between a pair of adjacent flights to eject the eggs located therebetween, and spring means for restoring the pivotable arms to their original position after the first transverse bar is moved out of engagement with the flight as the spider rotates, whereby the first transverse bar is thrust forward between the same pair of successive flights, so that any eggs which attempt to roll back between the flights are restricted from so doing.

4. Means for discharging eggs from a multi-flight moving conveyor wherein the flights are substantially parallel and extend transverse to the direction of motion of the conveyor, and the adjacent flights are spaced apart a distance large enough to accommodate only one egg therebetween; said means for discharging the eggs from the flights comprising a multi-armed spider adapted to be synchronously moved with the flights, pivotable arms mounted on the arms of the spider, a plurality of transverse bars secured to said pivotable arms, said bars extending in the same direction as the flights, said bars being disposed along the length of said pivotable arms so that at least one bar is located on each side of said pivotal connection between the pivotable arm and the spider arm, a first bar of the plurality of transverse bars being adapted to engage the flight behind the egg to be ejected when the spider is rotated, whereby the pivotable arm is pivoted and a second transverse bar is extended between a pair of adjacent flights to eject the eggs located therebetween, spring means for restoring the pivotable arms to their original position after the first transverse bar is moved out of engagement with the flight as the spider rotates, whereby the first transverse bar is thrust forward between the same pair of successive flights, so that any eggs which attempt to roll back between the flights are restricted from so doing, and means on said first transverse bar adapted to cooperate with the adjacent flight so that the first transverse bar is not suddenly snapped forward by said spring means.

5. An egg drying machine comprising a plurality of movable flights for moving the washed eggs over a predetermined path through said egg drying machine, means for drying the eggs, means for discharging the dried eggs from the egg drying machine, and means for aligning the eggs in rows as they are conveyed by said flights through the egg drying machine, said aligning means comprising a plurality of fixed wires positioned transversely to the flights along a portion of the run of said flights, and a plurality of fixed sheet members positioned transversely with respect to the flights, said sheet members extending along the run of the flights beyond said fixed wires to form extensions of the aligning rows formed by the wire aligning members.

6. An egg drying machine for use with an egg washing machine, said egg drying machine comprising a plurality of movable flights for removing the washed eggs from the egg washing machine, means for drying the eggs, said egg drying means comprising a screen over which the flights and eggs carried thereby pass thereover, said screen being adapted to be moved in the same direction as the direction of motion of the conveyor, a blower adapted to blow air over the eggs when said eggs are passing over said movable screen, means for aligning the eggs in rows as they pass through the drying machine, said aligning means comprising a plurality of fixed wires positioned transversely to the flights along a portion of the run of said flights, and a plurality of fixed sheet members positioned transversely with respect to the flights, said sheet members extending along the run of the flights beyond said fixed wires to form extensions of the aligning rows formed by the wire aligning members.

7. An egg drying machine for use with an egg washing machine, said egg drying machine comprising a plurality of movable flights for removing the washed eggs from the egg washing machine, means for drying the eggs, said egg drying means comprising a screen over which the flights and eggs carried thereby pass thereover, said screen being adapted to be moved in the same direction as the direction of motion of the conveyor, a blower adapted to blow air over the eggs when said eggs are passing over said movable screen, means for aligning the eggs in rows as they pass through the drying machine, said aligning means comprising a plurality of fixed wires positioned transversely to the flights along a portion of the run of said flights, and a plurality of fixed sheet members positioned transversely with respect to the flights, said sheet members extending along the run of the flights beyond said fixed wires to form extensions of the aligning rows formed by the wire aligning members, said fixed sheet members being disposed close to the surface of the movable screen and forming side walls adjacent the eggs, which side walls are adapted to guide and improve the circulation of the air being blown over the eggs being dried, whereby greater efficiency of drying is obtained.

8. An egg drying machine for use with an egg washing machine, said egg drying machine comprising a plurality of movable flights for removing the washed eggs from the egg washing machine, means for drying the eggs, said egg drying means comprising a screen over which the flights and eggs carried thereby pass thereover, said screen being adapted to be moved in the same direction as the direction of motion of the conveyor, a blower adapted to blow air over the eggs when said eggs are passing over said movable screen, means for aligning the eggs in rows as they pass through the drying machine, said aligning means comprising a plurality of fixed wires positioned transversely to the flights along a portion of the run of said flights, and a plurality of fixed sheet members positioned transversely with respect to the flights, said sheet members extending along the run of the flights beyond said fixed wire to form extensions of the aligning rows formed by the wire aligning members, said fixed sheet members being disposed close to the surface of the movable screen and forming side walls adjacent the eggs, which side walls are adapted to guide and improve the circulation of the air being blown over the eggs being dried, whereby greater efficiency of drying is obtained, said flights having recesses formed therein adapted to register with the fixed sheet members, whereby the fixed sheet members may be mounted closer to the movable screen.

9. An egg processing machine comprising conveyor means for moving washed eggs over a predetermined path, means along said predetermined path for drying the eggs, means for discharging the dried eggs from the conveyor, receiving means for receiving the eggs discharged from said conveyor, said receiving means including a second conveyor adapted to carry away the discharged eggs, and flexible members spaced above the second conveyor a distance less than the diameter of an egg adapted to engage the eggs disposed on the second conveyor to control the rolling of the eggs upon said second conveyor.

10. An egg processing machine comprising conveyor means for moving washed eggs over a predetermined path, said conveyor means including a plurality of movable flights between adjacent pairs of which the eggs are positioned, blower means along said predetermined path for drying the eggs, means entering between pairs of adjacent flights for discharging the dried eggs from between said conveyor flights, a portion of the run of said conveyor means descending past a station at which the eggs are discharged from the conveyor, said descending portion of the run of the conveyor being located after the blower means, and a receiving means adapted to receive the eggs which are discharged from the conveyor, said receiving means being mounted adjacent said descending portion of the run of said conveyor.

11. An egg drying machine for use with an egg washing machine, said egg drying machine comprising conveyor means for removing the washed eggs from the egg washing machine, said conveyor means including a plurality of movable flights adapted to move over a predetermined path through said egg drying machine, blower means for drying the eggs, means for discharging the dried eggs from the egg drying machine, the portion of the run of the conveyor means which transports the eggs up to and past the blower means being constantly ascending, the portion of the run of said conveyor means, located after the blower means, descending, means for aligning the eggs in rows as they are conveyed by said conveyor through the egg drying machine, said aligning means comprising a plurality of fixed wires positioned transversely to the flights along a portion of the run of said flights, a plurality of fixed sheet members aligned transversely with respect to the flights, said fixed sheet members extending along the run of the flights beyond said fixed wires to form extensions of the aligning rows formed by the wire aligning members, and a second set of wire aligning members positioned transversely to the flights adjacent the descending run of the conveyor.

12. An egg drying machine for use with an egg washing machine, said egg drying machine comprising conveyor means for removing the washed eggs from the egg washing machine, said conveyor means including a plurality of movable flights adapted to move over a predetermined path through said egg drying machine, blower means for drying the eggs, means for discharging the dried eggs from the egg drying machine, the portion of the run of the conveyor means which transports the eggs up to and past the blower means being constantly ascending, the portion of the run of said conveyor means, located after the blower means, descending, whereby successive flights pass a level at which the eggs are discharged from said conveyor, means for aligning the eggs in rows as they are conveyed by said conveyor through the egg drying machine, said aligning means comprising a plurality of fixed wires positioned transversely to the flights along a portion of the run of said flights, a plurality of fixed sheet members aligned transversely with respect to the flights, said fixed sheet members extending along the run of the flights beyond said fixed wires to form extensions of the aligning rows formed by the wire aligning members, and a second set of wire aligning members positioned transversely to the flights adjacent the descending run of the conveyor, said second set of wire aligning members terminating above said level of discharge from the conveyor, whereby the means for discharging the eggs will not be interfered with.

13. An egg drying machine comprising conveyor means for moving washed eggs over a predetermined path through said egg drying machine, said conveyor means comprising a pair of spaced, continuous moving elements and a plurality of movable flights, blower means for drying the eggs, a portion of the run of the conveyor means which transports the eggs up to and past the blower means being constantly ascending, whereby the drainage of fluid is in a direction opposite to the direction of advance of the eggs, and means for discharging the dried eggs from the egg drying machine, a portion of the run of said conveyor means, descending, whereby successive flights pass a level at which the eggs are discharged from the conveyor, said descending portion of the conveyor run being located after the blower means, each of said conveyor flights including an outer portion substantially perpendicular to the direction of travel of the flight and secured at its ends to said continuous moving elements, and an inner portion extending at an obtuse angle from said outer portion in a direction opposite to the direction of travel of the flights, said inner portions of the flights being spaced from a surface over which the eggs are rolled by said conveyor means, said outer and inner portions of the flights cooperating, when the flights pass through the descending run of the conveyor, to form a cradle for the eggs, wherein the eggs are positioned for discharge action thereupon by the discharge means.

14. An egg drying machine comprising, in combination; a multi-flight moving conveyor, for conveying washed eggs over a predetermined path, wherein the flights of said conveyor extend transverse to the direction of motion of the conveyor and adjacent flights of said conveyor are spaced apart a distance large enough to accommodate only one egg therebetween; an endless wire screen positioned along a portion of said path over which said eggs are conveyed, said wire screen being disposed beneath said conveyor means and providing a substantially flat foraminous surface over which the eggs carried by said conveyor are caused to roll; a blower blowing air over the eggs when said eggs are passing over said screen; and means for moving said endless wire screen so that said flat foraminous surface moves in the same direction as the direction of movement of said conveyor and at a speed greater than the conveyor speed, whereby the eggs are caused to rotate in a direction opposite to that caused by the movement of the conveyor.

15. An egg processing machine as set forth in claim 14 including means for cleaning said moving screen comprising a fluid bath through which the moving screen passes and a brush positioned to have the moving screen scrub thereagainst.

16. An egg drying machine comprising, in combination; a multi-flight moving conveyor, for conveying washed eggs over a predetermined path, wherein the flights of said conveyor extend transverse to the direction of motion of the conveyor and adjacent flights of said conveyor are spaced apart a distance large enough to accommodate only one egg therebetween; an endless wire screen positioned along a portion of said path over which said eggs are conveyed, said wire screen being disposed beneath said conveyor means and providing a substantially flat foraminous surface over which the eggs carried by said conveyor are caused to roll, a blower blowing air over the eggs when said eggs are passing over said screen; and means for moving said endless wire screen so that said flat foraminous surface moves in the same direction as the direction of movement of said conveyor and at a speed substantially three times the speed of the conveyor, whereby the eggs are caused to rotate in a direction opposite to that caused by the movement of the conveyor.

17. An egg drying machine comprising, in combination; a multi-flight moving conveyor, for conveying washed eggs over a predetermined path, wherein the flights of said conveyor extend transverse to the direction of motion of the conveyor and adjacent flights of said conveyor are spaced apart a distance large enough to accommodate only one egg therebetween; an endless wire screen positioned along a portion of said path over which said eggs are conveyed, said wire screen being disposed beneath said conveyor means and providing a substantially flat foraminous surface over which the eggs carried by said conveyor are caused to roll; a blower blowing air over the eggs when said eggs are passing over said screen; said endless wire screen being movable so that said flat foraminous surface moves in the same direction as the direction of movement of said conveyor and at a speed greater than the conveyor speed, whereby the eggs are caused to rotate in a direction opposite to that caused by the movement of the conveyor; and a single drive means for driving said blower and for moving said conveyor and said endless screen.

18. An egg drying machine comprising, in combination; conveyor means for conveying washed eggs over a predetermined path; a wire screen positioned along a portion of the path of said conveyor and positioned to have the eggs, which are carried by said conveyor, roll thereover; and a blower blowing air over the eggs when said eggs are passing over said screen; said conveyor means including a plurality of flights extending transverse to the direction of movement of the conveyor means and movable with said conveyor means, adjacent flights being spaced apart a distance large enough to accommodate only one egg therebetween, said flights extending over a height substantially coextensive with the height of an egg, and said flights being shaped to function as air baffles for directing the air delivered by said blower against the wet eggs, whereby the water on the egg is forced down around the egg to a point where the water contacts the screen and is drained off the egg, leaving but a thin film of water on the egg to be evaporated by said blown air.

19. An egg drying machine comprising, in combination; conveyor means for conveying washed eggs over a predetermined path; a wire screen positioned along a portion of the path of said conveyor and positioned to have the eggs, which are carried by said conveyor, roll thereover; and a blower blowing air over the eggs when said eggs are passing over said screen; said conveyor means including a plurality of flights extending transverse to the direction of movement of the conveyor means and movable with said conveyor means, adjacent flights being spaced apart a distance large enough to accommodate only one egg therebetween, said flights extending over a height substantially coextensive with the height of the egg, said flights being shaped to function as air baffles for directing the air delivered by said blower against the wet eggs, whereby the water on the egg is forced down around the egg to a point where the water contacts the screen and is drained off the eggs, leaving but a thin film of water on the egg to be evaporated by said blower air; and means moving said wire screen relative to the eggs which are rolling thereover, whereby the water transferred to the screen from the egg is moved away from contact with the egg where it is then blown from the screen by the blown air.

20. An egg processing machine comprising conveyor means for moving washed eggs over a predetermined path, said conveyor means including a plurality of movable flights, blower means along said predetermined path for drying the eggs, portions of the run of said conveyor means, located after said blower means, being along arcs which are spaced vertically and laterally, the portion of the run of said conveyor means between said spaced arcs being substantially straight and descending from the upper arc to the lower arc with the outer side of said conveyor means facing upwardly during said entire descent, and means along said straight descending run of the conveyor for forcing the eggs in said conveyor upwardly and outwardly of the conveyor to effect discharge of the eggs from the conveyor.

21. An egg processing machine comprising conveyor means for moving washed eggs over a predetermined path, said conveyor means including a plurality of movable flights, blower means along said predetermined path for drying the eggs, portions of the run of said conveyor means, located after said blower means, being along arcs which are spaced vertically and laterally, the portion of the run of said conveyor means between said spaced arcs being substantially straight and descending from the upper arc to the lower arc with the outer side of said conveyor means facing upwardly during said entire descent, means along said straight descending run of the conveyor for forcing the eggs in said conveyor upwardly and outwardly of the conveyor to effect discharge of the eggs from the conveyor, and means operatively connected with said straight descending run of said conveyor to keep the eggs in said descending run from being discharged prematurely from the conveyor flights.

22. An egg processing machine comprising conveyor means for moving washed eggs over a predetermined path, said conveyor means including a plurality of movable flights, blower means along said predetermined path for drying the eggs, portions of the run of said conveyor means, located after said blower means, being along arcs which are spaced vertically and laterally, the portion of the run of said conveyor means between said spaced arcs being substantially straight and descending from the upper arc to the lower arc with the outer side of said conveyor means facing upwardly during said entire descent, means along said straight descending run of the conveyor for forcing the eggs in said conveyor upwardly and outwardly of the conveyor to effect discharge of the eggs from the conveyor, and a portion of the run of said conveyor means which transports the egg to and through the blower means being constantly ascending, whereby the drainage of fluid from the eggs is in a direction opposite to the direction of advance of the eggs.

23. Means for discharging substantially uniformly sized articles from a multi-flight moving conveyor wherein the flights are substantially parallel and extend transverse to the direction of motion of the conveyor and the adjacent flights are spaced apart a distance large enough to accommodate only one article therebetween; said means for discharging the articles from the flights comprising a multi-armed spider adapted to be synchronously moved with the flights, pivotable arms mounted on the arms of the spider, a plurality of transverse bars secured to said pivotable arms, said bars extending in the same direction as the flights, said bars being disposed along the length of said pivotable arms so that at least one bar is located on each side of said pivotal connection between the pivotable arm and the spider arm, one of the plurality of transverse bars being adapted to engage the flight behind the article to be ejected when the spider is rotated, whereby the pivotable arm is pivoted and a second transverse bar is extended between a pair of adjacent flights to eject the article located therebetween.

24. A conveyor for conveying eggs along a predetermined path past a first station where drying air is blown over the eggs and past a later station at which the eggs are discharged from the conveyor; said conveyor comprising a pair of spaced continuous moving elements, a plurality of spaced flights substantially parallel to each other and extending transversely to the direction of movement of the conveyor, each flight having a side facing forwardly in the direction of motion of the conveyor and a side facing rearwardly, said flights each having an outer portion secured at its ends to said continuous elements and an inner portion extending at an obtuse angle from said outer portion in a direction opposite to the direction of movement of the conveyor, adjacent flights adapted to have one row of eggs positioned therebetween, the forwardly facing side of the outer portion of each flight adapted to engage the eggs to roll the eggs along a portion of the path of the conveyor, the rearwardly extending inner portion of each flight directing a portion of the drying air toward the under surfaces of the eggs positioned behind said flight, said conveyor adapted to move along a descending run past said station at which the eggs are discharged, and said outer and inner portions of each flight forming an upwardly opening cradle for the eggs positioned behind the flight, wherein the eggs are positioned when the conveyor passes through said descending run.

25. A conveyor for conveying eggs along a predetermined path past a first station where drying air is blown over the eggs and past a later station at which the eggs are discharged from the conveyor; said conveyor comprising a pair of spaced continuous moving elements, a plurality of spaced flights substantially parallel to each other and extending transversely to the direction of movement of the conveyor, each flight having a side facing forwardly in the direction of motion of the conveyor and a side facing rearwardly, said flights each having an outer portion secured at its ends to said continuous elements and an inner portion extending at an obtuse angle from said outer portion in the direction opposite to the direction of movement of the conveyor, adjacent flights adapted to have one row of eggs positioned therebetween, the forwardly facing side of each flight adapted to push the eggs positioned forwardly thereof over a portion of the run of the conveyor, said conveyor adapted to move along a descending portion of its run past said station at which the eggs are discharged, and said outer and inner portions of each flight forming an upwardly opening cradle for supporting and carrying the eggs positioned behind the flight, wherein the eggs are positioned when the conveyor passes through said descending run.

References Cited in the file of this patent

UNITED STATES PATENTS

| | | |
|---|---|---|
| 599,101 | Kanne | Feb. 15, 1898 |
| 1,013,506 | Miller et al. | Jan. 2, 1912 |
| 1,037,254 | Hopkins | Sept. 3, 1912 |
| 1,049,930 | Skinner | Jan. 7, 1913 |
| 1,078,110 | Stamm | Nov. 11, 1913 |
| 1,092,609 | Taliaferro | Apr. 7, 1914 |
| 1,390,268 | Beckett | Sept. 13, 1921 |
| 1,530,415 | Rousell | Mar. 17, 1925 |
| 1,547,276 | Wentz | July 28, 1925 |
| 1,550,365 | Jones | Aug. 18, 1925 |
| 1,628,327 | Parker | May 10, 1927 |
| 1,706,554 | Weber | Mar. 26, 1929 |
| 1,776,784 | Cramer | Sept. 30, 1930 |
| 1,780,924 | Ingraham | Nov. 11, 1930 |
| 1,852,405 | Farley | Apr. 5, 1932 |
| 1,452,844 | Ogburn | Apr. 24, 1932 |
| 1,932,124 | Tobey | Oct. 24, 1933 |
| 1,964,275 | Secondo | June 26, 1934 |
| 2,039,280 | Brogden | May 5, 1936 |
| 2,073,837 | Ghent | Mar. 16, 1937 |
| 2,076,487 | Wayland | Apr. 6, 1937 |
| 2,179,868 | Stebler | Nov. 14, 1939 |
| 2,209,340 | Landry | July 30, 1940 |
| 2,240,443 | Paul | Apr. 29, 1941 |
| 2,250,238 | Smith | July 22, 1941 |
| 2,263,627 | Herold | Nov. 25, 1941 |
| 2,315,246 | Cunning | Mar. 30, 1943 |
| 2,360,257 | Mueller | Oct. 10, 1944 |
| 2,371,867 | Bayles | Mar. 20, 1945 |
| 2,373,325 | Mayer | Apr. 10, 1945 |
| 2,395,350 | Smith | Feb. 19, 1946 |
| 2,408,648 | Inman | Oct. 1, 1946 |
| 2,441,884 | Johnson | May 18, 1948 |
| 2,442,475 | Swanson | June 1, 1948 |
| 2,488,230 | Page | Nov. 15, 1949 |
| 2,497,655 | Bramson | Feb. 14, 1950 |
| 2,497,767 | Hallead | Feb. 14, 1950 |
| 2,500,075 | Hiller | Mar. 7, 1950 |
| 2,502,134 | Erickson | Mar. 28, 1950 |
| 2,502,728 | Johnson | Apr. 4, 1950 |
| 2,588,787 | Wright | Mar. 11, 1952 |

FOREIGN PATENTS

| | | |
|---|---|---|
| 528,347 | Great Britain | Oct. 28, 1940 |